J. A. WITMAN & G. W. SEIBERT.
Millstone-Dress.

No. 162,733.

Patented April 27, 1875.

WITNESSES
INVENTORS.
John A. Witman
George W. Seibert.
By Leggett & Leggett, Attorneys.

THE GRAPHIC CO.PHOTO-LITH.39 & 41 PARK PLACE, N.Y.

UNITED STATES PATENT OFFICE.

JOHN A. WITMAN AND GEORGE W. SEIBERT, OF MIDDLETOWN, PA.

IMPROVEMENT IN MILLSTONE-DRESS.

Specification forming part of Letters Patent No. 162,733, dated April 27, 1875; application filed March 23, 1875.

*To all whom it may concern:*

Be it known that we, JOHN A. WITMAN and GEORGE W. SEIBERT, of Middletown, in the county of Dauphin and State of Pennsylvania, have invented certain new and useful Improvements in Millstone-Dress; and I do hereby declare the following to be a full, clear, and exact description of the invention, such as will enable others skilled in the art to which it pertains to make and use it, reference being had to the accompanying drawings, which form part of this specification.

Our invention relates to certain new and useful improvements in millstone-dress.

Figure 1:
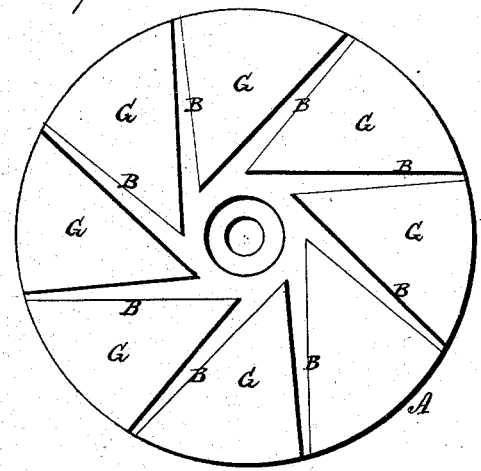
Figure 2:
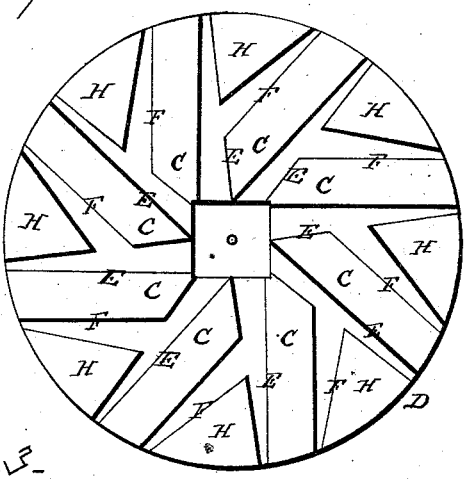
Figure 3:
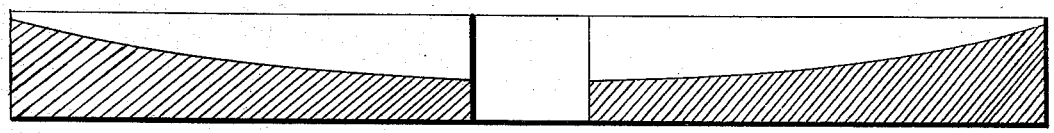
Figure 4:
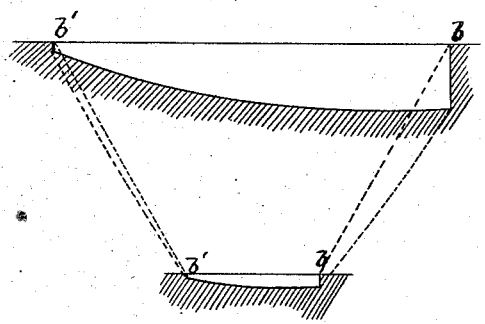

In the drawings, Figure 1 is a face or inverted plan view of the top stone or runner, showing the manner of dressing it; Fig. 2, a plan view of the ground or bed stone; Fig. 3, a transverse section, showing the furrows and their taper from the center of the stone outward; Fig. 4, view, in cross-section, showing the shape and full size of the furrows at the eye and skirt.

Our invention has for its object the dressing of millstones in a simple, scientific, and effective manner, whereby the proper amount of cutting faces or edges and lands is obtained, so that the grain is quickly and effectively cut or ground, the construction of the furrows and their angle in relation to the center of the stone being such as to throw the grain from the center, and cut it with a shearing motion, as hereinafter more fully set forth and shown.

The top stone or runner A is dressed with eight furrows, B. These furrows are deep at the eye or center of the stone, and their bottoms taper in a gradual upward curve or crescent from the center outward toward the skirt, as shown in Fig. 3. The furrows are also wide at the eye, and taper or incline toward each other as they approach the skirt, as shown in Figs. 1 and 2. The dimensions of the furrows are about as follows: three inches wide at the eye, tapered to one inch at the skirt; one-half inch deep at the back, with one-eighth inch crescent taper, to one-sixteenth of an inch at the skirt. G are the lands, which terminate in a point at an angle of about thirty-five degrees from the center of the eye in the stone. The draft of the dress of the stone is about four inches at the eye and fifteen at the skirt. The bottoms of these furrows B, Fig. 4, are cut and made as follows: The track edges $b$ are one-half an inch deep at the back, tapered to one-fourth of an inch at the skirt. The bottom edge curves upward and across the groove from the track edge, with one-eighth of an inch crescent taper toward the face of the stone and opposite edge of the furrow, forming the feather edge $b'$, which is one-sixteenth of an inch deep. At the same time that the bottom of the furrows curves upward and across the furrows, as shown in Fig. 4, it also curves upward and outward toward the skirt, as shown in Fig. 3. D is the bed-stone, dressed with eight double-tapered main furrows, E, constructed the same as the furrows B. These main furrows have no draft on the stone. C are lands, terminating in a point at an angle of forty degrees from the center of the stone. F are eight short or quarter furrows, also double, or constructed like the furrows E E, placed at an angle of about fifty-three degrees from the main furrows. They are two and a half inches wide at main furrow, tapered to seven-eighths of an inch at skirt, and having draft on main furrow. H are also lands, formed by the quarter or second furrows F terminating in a point where the quarter furrows join the main furrows.

By this arrangement and manner of dressing millstones, the grinding capacity of the stone, with the same time and power as ordinary, is greatly increased, and by the shape, size, and capacity of the furrow a greater quantity of air is admitted, which prevents heating, and keeps the stone cool while running; also, the proportion between the lands and furrows are so regulated that the dressing can be done with much less labor and time, and the dress is thereby rendered more permanent and durable.

Having thus described our invention, what we claim as new, and desire to secure by Letters Patent, is—

1. The combination of top stone A, dressed with eight double-tapered furrows, B, and lands G, and bed-stone D, dressed with eight double-tapered main furrows, E, short furrows F, and lands C H, all constructed and arranged as and for the purposes described.

2. The grooves or furrows constructed or formed as herein described—viz., wide at the eye, narrow at the skirt, perpendicular sides or edges $b\ b'$, deep at the back, and shallow at the skirt, the bottom deep on one side, with a curve upward and across the groove, and upward and outward toward the skirt—as and for the purposes described.

In testimony that we claim the foregoing we have hereunto set our hands this 19th day of March, 1875.

JNO. A. WITMAN.
GEO. W. SEIBERT.

Witnesses:
J. SCHAEFFER,
L. C. SCHAEFFER.